United States Patent
Tao et al.

(10) Patent No.: US 12,512,680 B1
(45) Date of Patent: Dec. 30, 2025

(54) CONTROL CIRCUIT AND CIRCUIT OF MULTI-SPEED CEILING FAN WITH LIGHT

(71) Applicant: SHENZHEN FUNPOWER GENERAL TECHNOLOGY CO., LTD., Shenzhen (CN)

(72) Inventors: Biaowei Tao, Shenzhen (CN); Zhengwei Li, Shenzhen (CN)

(73) Assignee: SHENZHEN FUNPOWER GENERAL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/193,671

(22) Filed: Apr. 29, 2025

(30) Foreign Application Priority Data

Jan. 17, 2025 (CN) .......................... 202510077619.0

(51) Int. Cl.
| | |
|---|---|
| *H02P 6/08* | (2016.01) |
| *H02J 4/00* | (2006.01) |
| *H02M 7/04* | (2006.01) |
| H02J 13/00 | (2006.01) |
| H05B 47/10 | (2020.01) |
| H05B 47/155 | (2020.01) |

(52) U.S. Cl.
CPC ................ *H02J 4/00* (2013.01); *H02M 7/04* (2013.01); *H02J 13/00009* (2020.01); *H02P 6/08* (2013.01); *H05B 47/10* (2020.01); *H05B 47/155* (2020.01); *Y04S 20/246* (2013.01)

(58) Field of Classification Search
CPC ......... H02J 13/00009; H02J 4/00; H02P 6/08; Y04S 20/246; H05B 47/10; H02M 7/04
See application file for complete search history.

(56) References Cited

U.S. PATENT DOCUMENTS

| | | | | |
|---|---|---|---|---|
| 4,480,197 A | * | 10/1984 | Hollaway ............ | H03K 17/735 307/155 |
| 4,491,772 A | * | 1/1985 | Bitting ................. | H02P 6/15 318/400.04 |
| 4,494,055 A | * | 1/1985 | Bitting ................. | H02P 6/30 416/5 |
| 4,499,408 A | * | 2/1985 | Bitting ................. | H02P 6/30 318/400.34 |
| 4,560,909 A | * | 12/1985 | Peil .................... | H02J 13/00009 315/201 |
| 5,541,584 A | * | 7/1996 | Mehta .................. | H05B 47/185 340/12.32 |

(Continued)

*Primary Examiner* — Rexford N Barnie
*Assistant Examiner* — Terrence R Willoughby
(74) *Attorney, Agent, or Firm* — Westbridge IP LLC

(57) ABSTRACT

Disclosed are a control circuit and a circuit of multi-speed ceiling fan with light. The control circuit includes a unidirectional controllable circuit, a bidirectional controllable circuit, and a regulation circuit. The unidirectional controllable circuit is connected to a mechanical switch and a load. The regulation circuit is connected to the unidirectional controllable circuit and the bidirectional controllable circuit, and the bidirectional controllable circuit is also connected to the mechanical switch and the load. The unidirectional controllable circuit is configured to transmit the negative half-wave voltage of the AC power source of the mechanical switch to the load. The bidirectional controllable circuit is configured to transmit both the positive half-wave voltage and the negative half-wave voltage of the AC power source of the mechanical switch to the load.

10 Claims, 3 Drawing Sheets

(56) References Cited

U.S. PATENT DOCUMENTS

| | | | | |
|---|---|---|---|---|
| 5,844,402 A | * | 12/1998 | Peschel | ............... G05F 3/04 |
| | | | | 323/262 |
| 10,470,276 B2 | * | 11/2019 | Chen | ............... H05B 45/10 |
| 2020/0366125 A1 | * | 11/2020 | Chen | ............... H02J 7/35 |

* cited by examiner

CONTROL CIRCUIT AND CIRCUIT OF MULTI-SPEED CEILING FAN WITH LIGHT

CROSS-REFERENCE TO RELATED APPLICATIONS

This application claims priority to Chinese Patent Application No. 202510077619.0, filed on Jan. 17, 2025, which is hereby incorporated by reference in its entirety.

TECHNICAL FIELD

The present application relates to the technical field of switch control, and particularly to a control circuit and a circuit of multi-speed ceiling fan with light.

BACKGROUND

Currently, there are many alternating current (AC) ceiling fan products on the market. As user demands evolve, there is a growing need to replace AC fan lights with more energy-efficient direct current (DC) alternatives. Most AC fan lights use wall controls connected in series with the live wire for fan speed regulation, switch control, and lighting control. In certain existing electrical setups, reinstalling wiring is either inconvenient or costly. As a result, many DC fan lights currently on the market rely on radio frequency (RF) wireless signals for fan control. Wireless transmitters include handheld and wall-mounted types, with the latter offering various power supply methods such as battery power and live-neutral wire power. However, these solutions have distinct drawbacks: RF signals are prone to interference from other co-frequency wireless signals; wall-mounted wireless transmitters have high production costs and expensive maintenance when damaged; some require regular battery replacement; handheld transmitters are easily lost.

SUMMARY

The main objective of the present application is to provide a control circuit and a circuit of multi-speed ceiling fan with light, aiming to solve the problems of co-frequency interference, battery replacement, and high costs associated with existing wireless transmitter switches. To achieve the above objective, the control circuit provided by the present application includes a unidirectional controllable circuit, a bidirectional controllable circuit and a regulation circuit. The unidirectional controllable circuit is connected to a mechanical switch and a load, the regulation circuit is connected to the unidirectional controllable circuit and the bidirectional controllable circuit, and the bidirectional controllable circuit is further connected to the mechanical switch and the load. The unidirectional controllable circuit is configured to transmit a negative half-wave voltage of an AC power source of the mechanical switch to the load, the bidirectional controllable circuit is configured to transmit a positive half-wave voltage and a negative half-wave voltage of the AC power source of the mechanical switch to the load, and the regulation circuit is configured to control at least one of the unidirectional controllable circuit and the bidirectional controllable circuit to disconnect, so as to realize different gear control of the load by regulating the waveform of the AC power source.

In an embodiment, the control circuit further includes a microcontroller and a switching input circuit; the microcontroller is connected to the regulation circuit, and the switching input circuit is connected to the microcontroller; the switching input circuit is configured to receive a gear control from a user; the microcontroller is configured to generate a stop signal and send the stop signal to the regulation circuit according to the gear control; and the regulation circuit is configured to control the bidirectional controllable circuit to disconnect when receiving the stop signal.

In an embodiment, the control circuit further includes a power supply circuit; the power supply circuit is connected to the microcontroller and the unidirectional controllable circuit; and the power supply circuit is configured to convert the AC power source transmitted by the mechanical switch into a DC voltage to supply power to the microcontroller.

In an embodiment, the control circuit further includes a rectifier filter circuit; the rectifier filter circuit is connected to the unidirectional controllable circuit, the bidirectional controllable circuit and the load; and the rectifier filter circuit is configured to convert the AC power source output by the unidirectional controllable circuit and the bidirectional controllable circuit into a DC power source to provide DC power to the load at the rear end.

In an embodiment, the control circuit includes a detection circuit and a driver circuit; the driver circuit is connected to the load and the rectifier filter circuit, and the detection circuit is connected to the unidirectional controllable circuit, the bidirectional controllable circuit and the load; the detection circuit is configured to detect a control signal from the AC power source regulated by the regulation circuit and transmit the control signal to the driver circuit; the driver circuit is configured to drive the load according to the control signal to realize different working states of the load.

In an embodiment, the unidirectional controllable circuit includes a first resistor, a first capacitor, a first zener diode, a fourth diode, and a unidirectional silicon controlled rectifier; one end of the first resistor is connected to the mechanical switch and the cathode of the unidirectional silicon controlled rectifier, another end of the first resistor is connected to the first capacitor, the control pole of the unidirectional silicon controlled rectifier and the anode of the first zener diode, another end of the first capacitor is grounded, the cathode of the first zener diode is connected to the anode of the unidirectional silicon controlled rectifier, the cathode of the fourth diode, and the power supply circuit, and the anode of the fourth diode is connected to the load.

In an embodiment, the power supply circuit includes a second diode, a second polarized capacitor, and a third capacitor; an anode of the second diode is connected to the cathode of the first zener diode, the anode of the unidirectional silicon controlled rectifier and the cathode of the fourth diode, a cathode of the second diode is connected to the anode of the second polarized capacitor, one end of the third capacitor and the load, and the cathode of the second polarized capacitor and another end of the third capacitor are grounded.

In an embodiment, the bidirectional controllable circuit includes a second resistor, a fifth diode, a bidirectional silicon controlled rectifier and a third resistor; one end of the second resistor is connected to the mechanical switch and a first main electrode of the bidirectional silicon controlled rectifier, another end of the second resistor is connected to the anode of the fifth resistor and a second main electrode of the bidirectional silicon controlled rectifier, the cathode of the fifth diode is connected to the load and the anode of the fourth diode, the control pole of the bidirectional silicon controlled rectifier is connected to one end of the third resistor and the regulation circuit, and another end of the third resistor is connected to the microcontroller.

In an embodiment, the regulation circuit includes a third diode, a first transistor, and a fourth resistor; the cathode of the third diode is connected to one end of the third resistor, the collector of the first transistor and the control pole of the bidirectional silicon controlled rectifier, the base of the first transistor is connected to one end of the fourth resistor, another end of the fourth resistor is connected to the microcontroller, and the anode of the fourth diode and the emitter of the first transistor are grounded.

The present application further provides a circuit of multi-speed ceiling fan with light, which includes the control circuit described above.

The present application provides a control circuit and a circuit of multi-speed ceiling fan with light. The control circuit includes a unidirectional controllable circuit, a bidirectional controllable circuit and a regulation circuit. The unidirectional controllable circuit is connected to a mechanical switch and a load, the regulation circuit is connected to the unidirectional controllable circuit and the bidirectional controllable circuit, and the bidirectional controllable circuit is further connected to the mechanical switch and the load. The unidirectional controllable circuit is configured to transmit a negative half-wave voltage of an AC power source of the mechanical switch to the load. The bidirectional controllable circuit is configured to transmit a positive half-wave voltage and a negative half-wave voltage of the AC power source of the mechanical switch to the load. The regulation circuit is configured to control at least one of the unidirectional controllable circuit and the bidirectional controllable circuit to disconnect, so as to realize different gear control of the load by regulating the waveform of the AC power source. By controlling the on and off states of the unidirectional controllable circuit and the bidirectional controllable circuit and adjusting the waveform of the AC power supply, different gear control of the load is achieved. The control circuit is connected in series to the live wire to draw power, eliminating the need for an additional neutral wire for the control circuit.

BRIEF DESCRIPTION OF THE DRAWINGS

To more clearly illustrate the technical solutions in the embodiments of the present application or in the prior art, the following briefly introduces the drawings required for describing the embodiments or the prior art. Obviously, the drawings described below are only some embodiments of the present application, and those of ordinary skill in the art can obtain other drawings based on the structures shown in these drawings without creative efforts.

Figure 1:
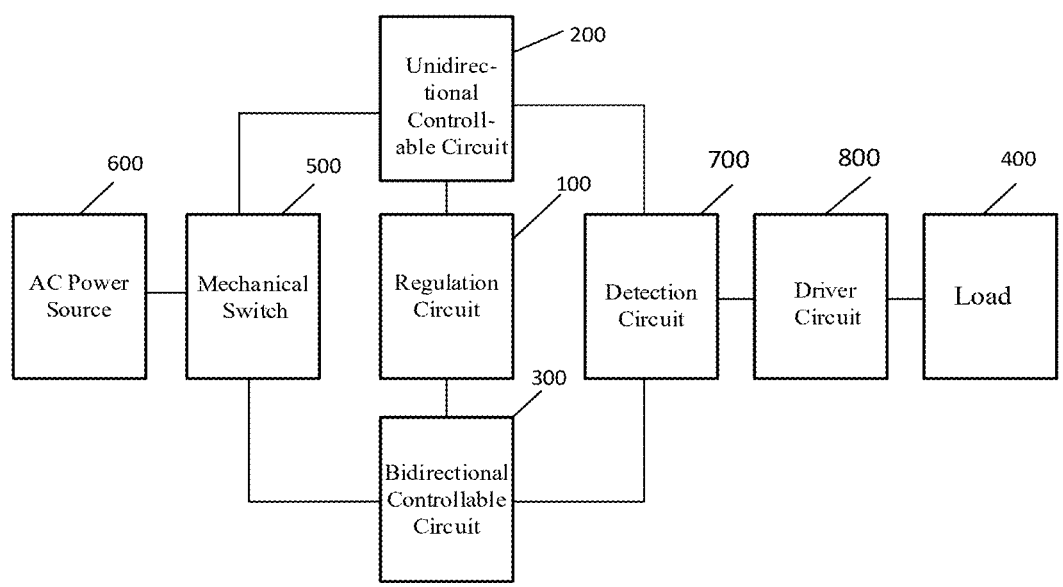
FIG. 1 is a schematic structural diagram of a control circuit according to an embodiment of the present application.

The realization of the objective, functional characteristics, and advantages of the present application are further described with reference to the accompanying drawings.

DETAILED DESCRIPTION OF THE EMBODIMENTS

The following will clearly and completely describe the technical solutions in the embodiments of the present application in conjunction with the accompanying drawings in the embodiments of the present application. Obviously, the described embodiments are only a part of the embodiments of the present application, rather than all of them. Based on the embodiments in the present application, all other embodiments obtained by those of ordinary skill in the art without creative efforts shall fall within the protection scope of the present application.

It should be noted that if the embodiments of the present application involve directional indications (such as up, down, left, right, front, rear, etc.), such directional indications are only used to explain the relative positional relationship, movement, etc. between components in a specific posture. When the specific posture changes, the directional indications will correspondingly change.

In addition, if the descriptions in the embodiments of the present application involve "first", "second", etc., such descriptions of "first", "second", etc. are only for descriptive purposes and should not be construed as indicating or implying their relative importance or implicitly indicating the number of indicated technical features. Therefore, features defined as "first" and "second" may explicitly or implicitly include at least one of such features. In addition, where "and/or" or appears throughout the text, its meaning includes three parallel solutions. The meaning of "and/or" appearing in the present application includes three parallel scenarios. For example, "A and/or B" includes only A, or only B, or both A and B. In addition, the technical solutions between various embodiments may be combined with each other, but must be based on the realization by those of ordinary skill in the art. When the combination of technical solutions is contradictory or cannot be implemented, it should be considered that such a combination of technical solutions does not exist and is not within the scope of the present application.

Currently, there are many AC ceiling fan products in use. With the change in user demands, there is a need to replace AC fan lights with more energy-efficient DC fan lights. Most AC fan light products use wall controls connected in series to the live wire for fan speed regulation, switch control, and lighting control. In some existing power usage scenarios, reinstalling wiring is inconvenient or incurs high costs. Therefore, many current DC fan lights use RF wireless signals for fan control. Wireless transmitters include handheld and wall-mounted types. Wall-mounted wireless transmitters have various power supply methods, such as battery power and live-zero wire power, but they have the following drawbacks respectively: RF signals are susceptible to interference from other co-frequency wireless signals; wall-mounted wireless transmitters have high production costs and high maintenance costs when damaged; some require regular battery replacement; and handheld wireless transmitters are easy to lose.

As shown in FIG. 1, the present application provides a control circuit and a circuit of multi-speed ceiling fan with light. The control circuit includes a unidirectional controllable circuit 200, a bidirectional controllable circuit 300, and a regulation circuit 100. The unidirectional controllable circuit is connected to a mechanical switch 500 and a load 400. The regulation circuit is connected to the unidirectional controllable circuit and the bidirectional controllable circuit. The bidirectional controllable circuit is further connected to the mechanical switch and the load. The unidirectional controllable circuit 200 is configured to transmit the negative half-wave voltage of the AC power source 600 of the mechanical switch to the load. The bidirectional controllable circuit 300 is configured to transmit the positive and negative half-wave voltages of the AC power source of the mechanical switch to the load. The regulation circuit 100 is configured to control at least one of the unidirectional controllable circuit and the bidirectional controllable circuit to disconnect, achieving different gear control of the load by regulating the waveform of the AC power source. By controlling the on and off states of the unidirectional controllable circuit and the bidirectional controllable circuit, the waveform of the AC power source 600 is regulated to achieve different gear control of the load. The control circuit is connected in series to the live wire to draw power, eliminating the need for an additional neutral wire for the control circuit.

It should be noted that the load may be a DC fan light product. The present application does not require re-wiring and can directly replace components in the original AC wall-controlled fan light control circuit, enabling the replacement of AC ceiling fans with more energy-efficient DC fan light products. It can not only achieve multi-speed fan control but also control the lighting.

It can be understood that this application can meet the control of fan multi-speed and lighting. The control circuit is directly connected in series to the input live wire of the original wall control switch for control. This application can directly install and replace the conventional wall control circuit without re-wiring, reducing installation costs and time. Compared with RF wireless products, it has low production costs, stable performance, no need for regular maintenance such as battery replacement, and no problem of losing the remote control.

In an embodiment, after the mechanical switch is turned on, the control circuit directly controls the unidirectional silicon controlled rectifier to remain conducting, transmitting the negative half-wave voltage of the AC power source to the load through the unidirectional silicon controlled rectifier. At the same time, after the unidirectional silicon controlled rectifier is conducting, power is obtained from the voltage difference between the input and output ends of the silicon controlled rectifier to supply the control regulation circuit. After the regulation circuit receives the control input signal from the control switch, it controls the on and off of the bidirectional silicon controlled rectifier to change the waveform of the output AC power source and achieve different gear or other controls.

In an embodiment, in addition to controlling the fan gears, it can also control light-emitting diode (LED) lights. After the mechanical switch is turned on, the control circuit controls the unidirectional silicon controlled rectifier to always conduct, and at the same time, power is obtained through the voltage drop between the input and output ends of the unidirectional silicon controlled rectifier to supply the control regulation circuit. The bidirectional silicon controlled rectifier always conducts when no control signal is sent. When the MCU in the control regulation circuit receives the switching quantity from the wall control switch, the control regulation circuit controls the bidirectional silicon controlled rectifier to disconnect and conduct; different numbers of disconnections and conductions are executed when different switching quantities are received to achieve different control signal transmissions.

In an embodiment, the unidirectional controllable circuit, the bidirectional controllable circuit, and the regulation circuit are connected in series to the mechanical switch of the original wall control switch, and the mechanical switch is connected in series to the live wire to assemble a new wall control switch. The new wall control switch can adjust multiple gears without re-wiring. The regulation circuit 100 of the wall control switch controls the conduction and cut-off of the unidirectional controllable circuit 200 or/and the bidirectional controllable circuit 300 to adjust the fan gears and lighting modes. The unidirectional controllable circuit 200 is used to transmit the negative half-wave voltage of the mechanical switch's AC power source to the load, and the bidirectional controllable circuit 300 is used to transmit the positive and negative half-wave voltages of the mechanical switch's AC power source to the load. The load is a DC fan light product. The control circuit further includes a rectifier filter circuit that converts the AC power source into DC power, a detection circuit 700 that detects control signals from the AC power source output by the regulation circuit 100, and a driver circuit 800 that drives the load according to the control signals.

Figure 2:
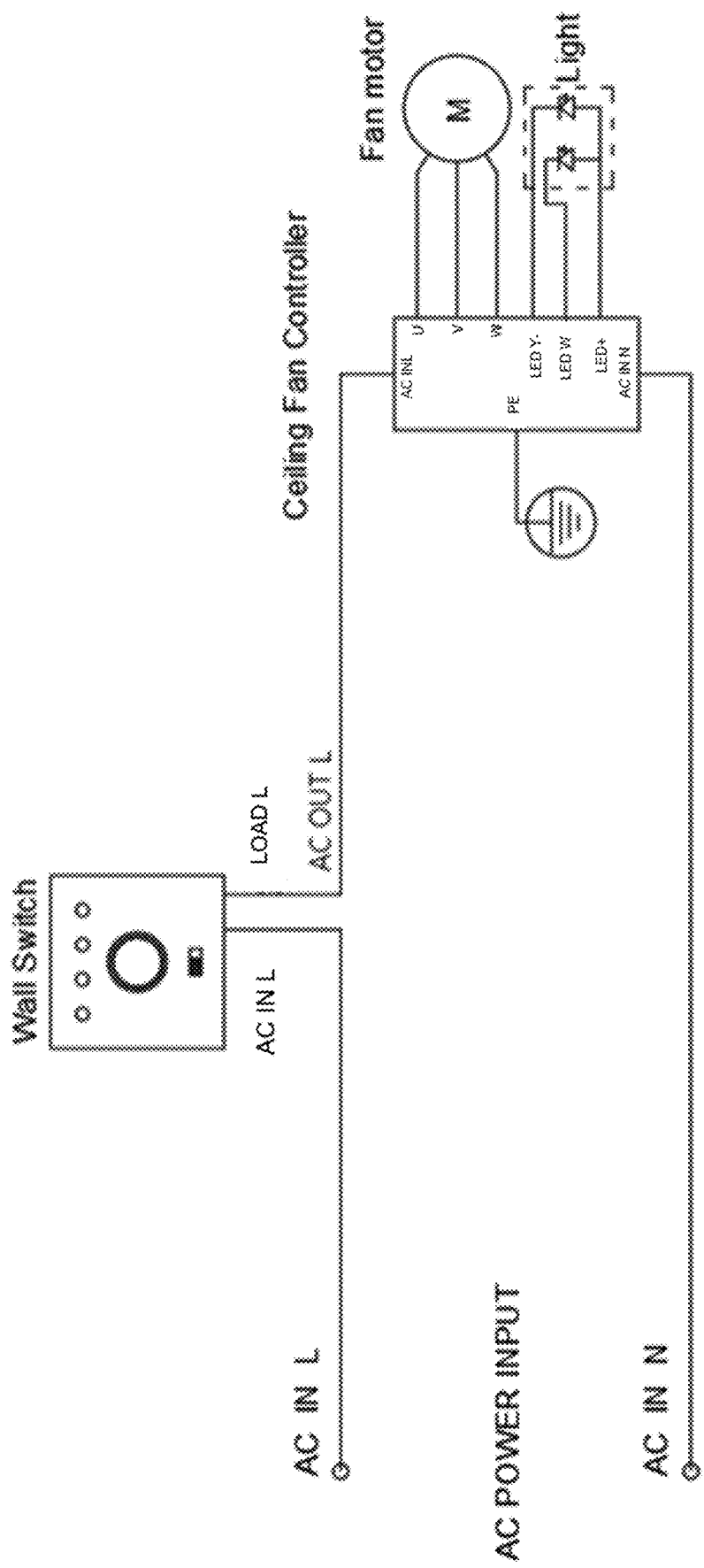
FIG. 2 is a schematic structural diagram of a control circuit according to another embodiment the present application.
Figure 3:
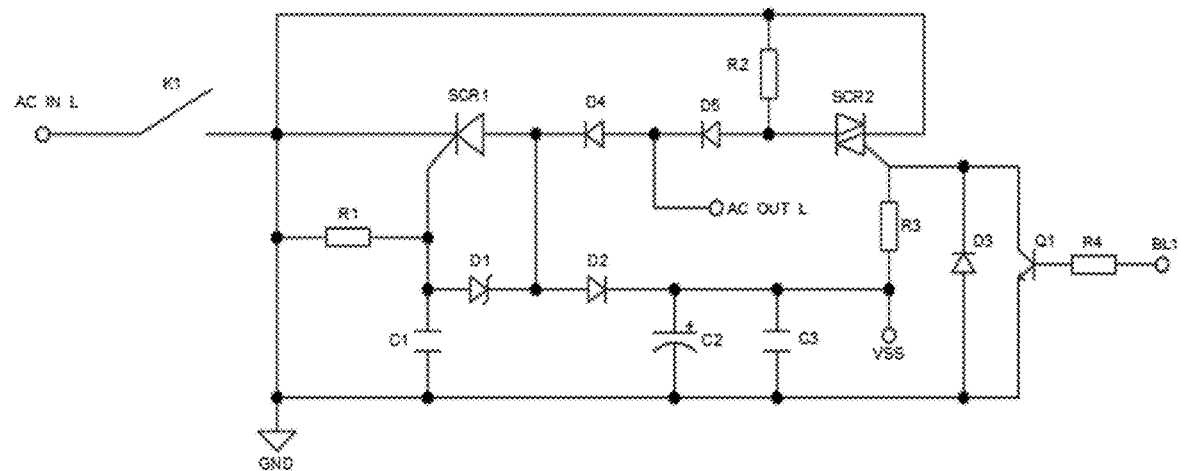
FIG. 3 is a circuit schematic diagram of a control circuit according to another the present application.

As shown in FIG. 2 and FIG. 3, FIG. 2 is a schematic structural diagram of a control circuit according to another embodiment of the present application, and FIG. 3 is a circuit schematic diagram of the control circuit according to another embodiment of the present application.

Based on the above embodiment, another embodiment of the control circuit of the present application is provided.

It can be understood that in an embodiment, the regulation circuit 100 controls the conduction and cut-off of the bidirectional controllable circuit 300 to adjust the fan gears and lighting modes, and the unidirectional controllable circuit is always conducting.

It should be noted that as shown in FIG. 2, Wall Switch is a wall control switch, including circuits such as a mechanical switch, a unidirectional controllable circuit, a bidirectional controllable circuit, and a regulation circuit. The power between AC IN L and AC IN N is AC power, where AC IN L is the live wire of the power source. AC IN L is connected to the mechanical switch, and the output end of the wall control switch is AC OUT L. The wall control switch has adjustable gears, and its internal circuit is as shown in FIG. 3.

The unidirectional controllable circuit includes a first resistor R1, a first capacitor C1, a first zener diode D1, a fourth diode D4, and a unidirectional silicon controlled rectifier SCR1. One end of the first resistor is connected to the mechanical switch K1 and the cathode of the unidirectional silicon controlled rectifier, and another end of the first resistor is connected to the first capacitor, the control pole of the unidirectional silicon controlled rectifier, and the anode of the first zener diode. Another end of the first capacitor is grounded. The cathode of the first zener diode is connected to the anode of the unidirectional silicon controlled rectifier, the cathode of the fourth diode, and the power supply circuit. The anode of the fourth diode is connected to the load.

It can be understood that the unidirectional silicon controlled rectifier SCR1 has three electrodes: a cathode, an anode, and a control pole. The unidirectional silicon controlled rectifier only allows current to flow in one direction, from the anode to the cathode, and the control pole can control the on and off of the current. When a forward voltage is applied between the anode and cathode, and a positive voltage is applied to the control pole, the unidirectional silicon controlled rectifier will conduct. Once conducting, even if the trigger current is removed, as long as the forward voltage between the anode and cathode is maintained, the silicon controlled rectifier will remain conducting until the current decreases below the holding current or a reverse voltage is applied, at which point the silicon controlled rectifier will turn off.

It should be noted that AC IN L is a sinusoidal AC power source. After the power at the AC IN L input end is turned on through the mechanical switch K1, it is connected to the load circuit through the unidirectional silicon controlled rectifier SCR1. When the voltage of AC IN L is in the positive half-wave, the control pole voltage of the unidirectional silicon controlled rectifier is positive, and the unidirectional silicon controlled rectifier SCR1 acts as a common diode with the cathode connected to the positive voltage, unable to conduct. AC IN L charges the first capacitor, and the unidirectional controllable circuit is turned off. When the voltage of AC IN Lis in the negative half-wave, the first zener diode D1 and the first capacitor C1 discharge, making the control pole voltage of the unidirectional silicon controlled rectifier positive. The unidirectional silicon controlled rectifier SCR1 acts as a common diode with the cathode connected to the negative voltage, and the unidirectional silicon controlled rectifier SCR1 and the fourth diode D4 conduct, transmitting the negative half-wave voltage of the mechanical switch's AC power source to the load.

The bidirectional controllable circuit includes a second resistor R2, a fifth diode D5, a bidirectional silicon controlled rectifier SCR2, and a third resistor R3. One end of the second resistor R2 is connected to the mechanical switch and the main electrode one of the bidirectional silicon controlled rectifier, and another end of the second resistor R2 is connected to the anode of the fifth diode and the second main electrode of the bidirectional silicon controlled rectifier. The cathode of the fifth diode D5 is connected to the load and the anode of the fourth diode. The control pole of the bidirectional silicon controlled rectifier is connected to one end of the third resistor R3 and the regulation circuit, and another end of the third resistor is connected to the microcontroller.

It can be understood that the bidirectional silicon controlled rectifier SCR2 has two anodes, two cathodes, and a control pole. The bidirectional silicon controlled rectifier can conduct and cut off in both forward and reverse directions. Applying a positive voltage to the control pole can control the conduction of the bidirectional silicon controlled rectifier, and applying a negative voltage to the control pole can control its cut-off.

It should be noted that when the regulation circuit outputs a high voltage to the control pole of the bidirectional silicon controlled rectifier SCR2, and when the voltage of AC IN L is in the positive half-wave with the control pole voltage of the bidirectional silicon controlled rectifier SCR2 connected to the regulation circuit being high, the bidirectional silicon controlled rectifier SCR2 conducts bidirectionally, and the fifth diode D5 also conducts, transmitting the positive half-wave voltage of the mechanical switch K1's AC power source to the load. When the voltage of AC IN Lis in the negative half-wave with the regulation circuit at high voltage, the bidirectional silicon controlled rectifier conducts bidirectionally, the fifth diode D5 is cut off, and the bidirectional controllable circuit is turned off.

In an embodiment, when the regulation circuit outputs a low voltage to the control pole of the bidirectional silicon controlled rectifier, the bidirectional silicon controlled rectifier is cut off, and the bidirectional controllable circuit remains turned off. The second resistor has a large resistance value to protect the bidirectional silicon controlled rectifier.

The regulation circuit includes a third diode D3, a first transistor Q1, and a fourth resistor R4. The cathode of the third diode D3 is connected to one end of the third resistor, the collector of the first transistor, and the control pole of the bidirectional silicon controlled rectifier. The base of the first transistor is connected to one end of the fourth resistor, and another end of the fourth resistor is connected to the microcontroller. The anode of the fourth diode and the emitter of the first transistor are grounded.

It should be noted that BL1 is connected to the microcontroller. When BL1 receives a high level, the transistor Q1 conducts, pulling the control pole voltage of the bidirectional silicon controlled rectifier SCR2 low, causing the bidirectional silicon controlled rectifier SCR2 to cut off. When the bidirectional silicon controlled rectifier SCR2 is cut off, the bidirectional controllable circuit is disconnected. When BL1 receives a low level, the transistor Q1 is cut off, causing the control pole voltage of the bidirectional silicon controlled rectifier SCR2 to be pulled high by VSS, and the bidirectional silicon controlled rectifier SCR2 conducts. When the bidirectional silicon controlled rectifier SCR2 conducts, the positive half-wave waveform of the power source at the AC OUT L output end is transmitted to the load.

The control circuit includes a microcontroller and a switching input circuit. The microcontroller is connected to the regulation circuit, and the switching input circuit is connected to the microcontroller. The switching input circuit is configured to receive gear control from the user. The microcontroller is configured to generate and send a stop signal to the regulation circuit according to the gear control. The regulation circuit is configured to control the bidirectional controllable circuit to disconnect when receiving the stop signal.

It should be noted that the microcontroller can be set to output different BL1 high-level control signal combinations upon receiving different gear controls, thereby achieving different control commands and changing the positive half-wave waveform of the power source at the AC OUT L output end. The control circuit further includes an light emitting diode (LED) display to indicate whether the wall control switch is in operation.

It can be understood that the microcontroller can be an MCU or FPGA, used to generate and send stop signals to the regulation circuit according to the gear control. When the gear control of the switching input circuit is at the highest level, BL1 remains at a low level. When the gear control is at the lowest level, BL1 remains at a high level. When the gear control is at an intermediate level, it controls the time for BL1 to output high and low levels.

The control circuit includes a power supply circuit. The power supply circuit is connected to the microcontroller and the unidirectional controllable circuit, the power supply circuit is configured to convert the AC power source transmitted by the mechanical switch into a DC voltage to supply power to the microcontroller.

It should be noted that the wall control switch of the control circuit only needs to be connected in series to the original power live wire for control, but the microcontroller requires DC power supply. Therefore, the power supply circuit converts the AC power of the mechanical switch into a stable DC power to supply the microcontroller and the switching input circuit.

The power supply circuit includes a second diode D2, a second polarized capacitor C2, and a third capacitor C3. The anode of the second diode D2 is connected to the cathode of the first zener diode D1, the anode of the unidirectional silicon controlled rectifier SCR1, and the cathode of the fourth diode. The cathode of the second diode is connected to the anode of the second polarized capacitor, one end of the third capacitor, and the load. The cathode of the second polarized capacitor and another end of the third capacitor are grounded.

It can be understood that voltage is collected from the voltage difference between the anode and cathode of the unidirectional silicon controlled rectifier SCR1, and after voltage regulation by the first zener diode D1, the second diode D2, the second polarized capacitor C2, and the third capacitor C3, VSS is obtained to supply power to the microcontroller. The first zener diode D1 is used to output a constant voltage, and the second polarized capacitor C2 is used to store charge, smooth the DC voltage, filter, and provide instantaneous large current.

In an embodiment, by keeping the unidirectional silicon controlled rectifier conducting, power is taken from the voltage difference between the anode and cathode of the unidirectional silicon controlled rectifier to achieve series power extraction for the wall control switch, eliminating the need for an additional neutral wire for the wall control switch. The regulation circuit controls the conduction and cut-off of the bidirectional silicon controlled rectifier to change the output power waveform and achieve different gear control of the load. The wall control switch is only connected in series to the system power live wire, enabling simultaneous gear control of the fan motor and LED lighting, simplifying installation and wiring requirements, being more suitable for existing installation circuits, and greatly reducing installation costs.

Figure 4:
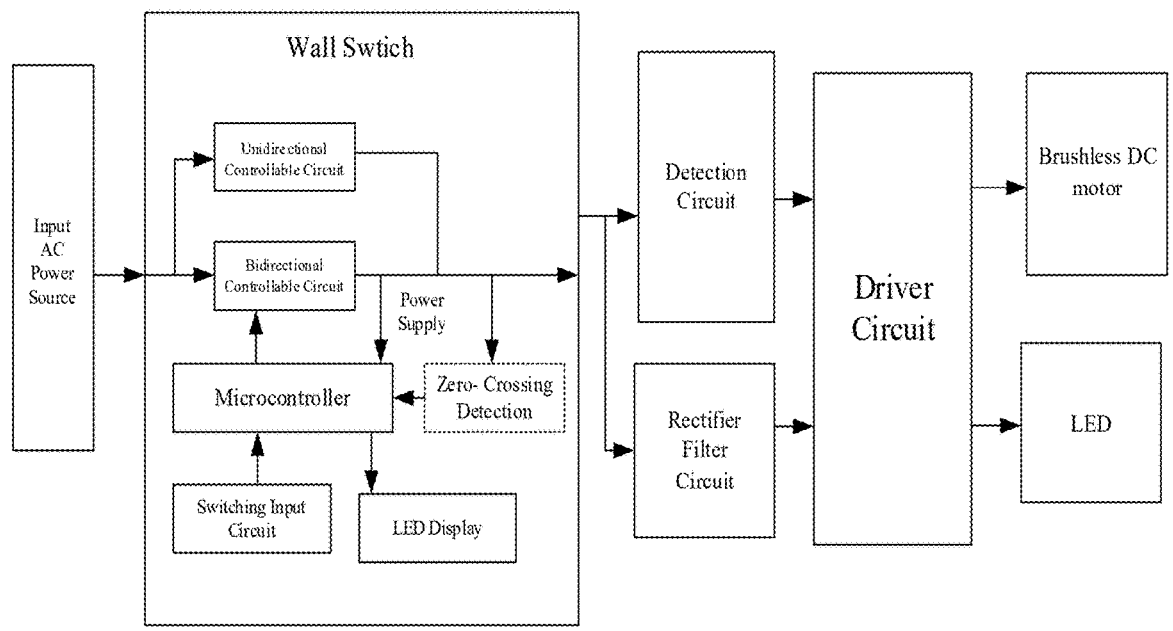
FIG. 4 is a schematic structural diagram of a control circuit according to another embodiment the present application.

As shown in FIG. 4, FIG. 4 is a schematic structural diagram of the control circuit according to another embodiment of the present application.

Based on the above embodiments, another embodiment of the control circuit of the present application is provided.

The control circuit includes a rectifier filter circuit. The rectifier filter circuit is connected to the unidirectional controllable circuit, the bidirectional controllable circuit, and the load, converting the AC power source output by the unidirectional and bidirectional controllable circuits into a DC power source to provide DC power to the load at the rear end.

It should be noted that the rectifier filter circuit in the detection and driver circuit rectifies and filters the AC power source provided by the unidirectional and bidirectional silicon controlled rectifiers into a DC power source to provide DC power to the rear-end control circuit and driver circuit.

As shown in FIG. 4, the load end further includes zero-crossing detection, a detection circuit, a rectifier filter circuit, a driver circuit, a brushless DC motor, and an LED.

The control circuit includes a detection circuit 700 and a driver circuit 800. The driver circuit 800 is connected to the load 400 and the rectifier filter circuit, and the detection circuit is connected to the unidirectional controllable circuit, the bidirectional controllable circuit, and the load. The detection circuit is configured to detect a control signal from the AC power source regulated by the regulation circuit and transmit them to the driver circuit. The driver circuit is configured to drive the load according to the control signals to realize different working states of the load.

It can be understood that the zero-crossing detection circuit can achieve precise phase control of the wall control output power source to ensure stable operation of the load. The rectifier filter circuit is used to convert the AC power output by the wall control switch into DC power and provide it to the driver circuit, which is used to drive and control the brushless DC motor and LED load.

In an embodiment, the driver circuit further includes an MCU controller, and the rectifier filter circuit further includes a voltage stabilization circuit. The rectifier filter circuit converts AC power into DC power and removes the AC component through a filtering circuit to make the output voltage as stable as possible. The voltage stabilization circuit can automatically adjust the output voltage according to changes in the input voltage to maintain stable output voltage. The detection circuit detects control signals from the AC power source regulated by the regulation circuit 100 and provides them to the MCU in the detection and driver circuit, which then controls the driving of the motor and LED load to achieve different working states.

It should be noted that the detection circuit is fully named an AC input power positive half-wave signal detection circuit, used to detect the positive half-wave output waveform of the bidirectional controllable circuit. Through an optocoupler circuit, it detects changes in the positive half-wave signal of the wall control switch power output and extracts control signals from the AC power source output by the regulation circuit to transmit to the MCU of the driver circuit. The driver circuit implements different functions upon receiving different control commands. In an embodiment, the control circuit includes a wall control switch, a detection circuit, a rectifier filter circuit, a driver circuit, and a brushless DC motor LED. This application converts AC power into DC power for the DC load while providing different gear controls through the wall control switch.

In this embodiment, the control circuit includes a wall control switch, a detection circuit, a rectification and filtering circuit, a driver circuit, and a brushless DC motor and LED. The present application converts AC power into DC power to supply DC loads, while providing different gear control through the wall control switch.

The present application further provides a circuit of multi-speed ceiling fan with light, which includes the control circuit. The specific structure of the control circuit refers to the above embodiments. Since the circuit of multi-speed ceiling fan with light employs all the technical solutions of the above embodiments, it at least has all the beneficial effects brought by the technical solutions of the above embodiments, which will not be repeated here.

The above descriptions are only exemplary embodiments of the present application and are not intended to limit the patent scope of the present application. Any equivalent structural modifications made under the technical concept of the present application using the contents of the specification and drawings of the present application, or direct/indirect applications in other related technical fields, are all included within the scope of the present application.

What is claimed is:
1. A control circuit, comprising:
a unidirectional controllable circuit;
a bidirectional controllable circuit; and
a regulation circuit,
wherein the unidirectional controllable circuit is connected to a mechanical switch and a load, the regulation circuit is connected to the unidirectional controllable circuit and the bidirectional controllable circuit, and the bidirectional controllable circuit is further connected to the mechanical switch and the load;
the unidirectional controllable circuit is configured to transmit a negative half-wave voltage of an AC power source to the load;
the bidirectional controllable circuit is configured to transmit a positive half-wave voltage and a negative half-wave voltage of the AC power source to the load; and
the regulation circuit is configured to control at least one of the unidirectional controllable circuit and the bidirectional controllable circuit to disconnect, so as to realize different gear control of the load by regulating the waveform of the AC power source.

2. The control circuit according to claim 1, further comprising:
a microcontroller connected to the regulation circuit; and
a switching input circuit connected to the microcontroller,
wherein the switching input circuit is configured to receive a gear control from a user, the microcontroller is configured to generate a stop signal and send the stop signal to the regulation circuit according to the gear control, and the regulation circuit is configured to control the bidirectional controllable circuit to disconnect when receiving the stop signal.

3. The control circuit according to claim 2, further comprising:
a power supply circuit connected to the microcontroller and the unidirectional controllable circuit,
wherein the power supply circuit is configured to convert the AC power source transmitted by the mechanical switch into a DC voltage to supply power to the microcontroller.

4. The control circuit according to claim 3, further comprising:
a rectifier filter circuit connected to the unidirectional controllable circuit, the bidirectional controllable circuit and the load,
wherein the rectifier filter circuit is configured to convert the AC power source output by the unidirectional controllable circuit and the bidirectional controllable circuit into a DC power source to provide DC power to the load at a rear end.

5. The control circuit according to claim 4, further comprising:
a detection circuit connected to the unidirectional controllable circuit, the bidirectional controllable circuit and the load; and
a driver circuit connected to the load and the rectifier filter circuit,
wherein the detection circuit is configured to detect a control signal from the AC power source regulated by the regulation circuit and transmit the control signal to the driver circuit, and the driver circuit is configured to drive the load according to the control signal to realize different working states of the load.

6. The control circuit according to claim 3, wherein:
the unidirectional controllable circuit comprises a first resistor, a first capacitor, a first zener diode, a fourth diode, and a unidirectional silicon controlled rectifier;
one end of the first resistor is connected to the mechanical switch and a cathode of the unidirectional silicon controlled rectifier, and another end of the first resistor is connected to the first capacitor, a control pole of the unidirectional silicon controlled rectifier and an anode of the first zener diode; and
another end of the first capacitor is grounded, a cathode of the first zener diode is connected to an anode of the unidirectional silicon controlled rectifier, a cathode of the fourth diode and the power supply circuit, and an anode of the fourth diode is connected to the load.

7. The control circuit according to claim 6, wherein:
the power supply circuit comprises a second diode, a second polarized capacitor, and a third capacitor;
an anode of the second diode is connected to the cathode of the first zener diode, the anode of the unidirectional silicon controlled rectifier and the cathode of the fourth diode;
a cathode of the second diode is connected to an anode of the second polarized capacitor, one end of the third capacitor and the load; and
a cathode of the second polarized capacitor and another end of the third capacitor are grounded.

8. The control circuit according to claim 7, wherein:
the bidirectional controllable circuit comprises a second resistor, a fifth diode, a bidirectional silicon controlled rectifier, and a third resistor;
one end of the second resistor is connected to the mechanical switch and a first main electrode of the bidirectional silicon controlled rectifier, and another end of the second resistor is connected to an anode of the fifth resistor and a second main electrode of the bidirectional silicon controlled rectifier; and
a cathode of the fifth diode is connected to the load and the anode of the fourth diode, a control pole of the bidirectional silicon controlled rectifier is connected to one end of the third resistor and the regulation circuit, and another end of the third resistor is connected to the microcontroller.

9. The control circuit according to claim 8, wherein:
the regulation circuit comprises a third diode, a first transistor, and a fourth resistor;
a cathode of the third diode is connected to one end of the third resistor, a collector of the first transistor and the control pole of the bidirectional silicon controlled rectifier; and
a base of the first transistor is connected to one end of the fourth resistor, another end of the fourth resistor is connected to the microcontroller, and the anode of the fourth diode and an emitter of the first transistor are grounded.

10. A circuit of multi-speed ceiling fan with light, comprising the control circuit according to claim 1.

* * * * *